Jan. 10, 1939. W. H. DIEMER 2,143,434
VELOCIPEDE CONSTRUCTION
Filed May 16, 1935
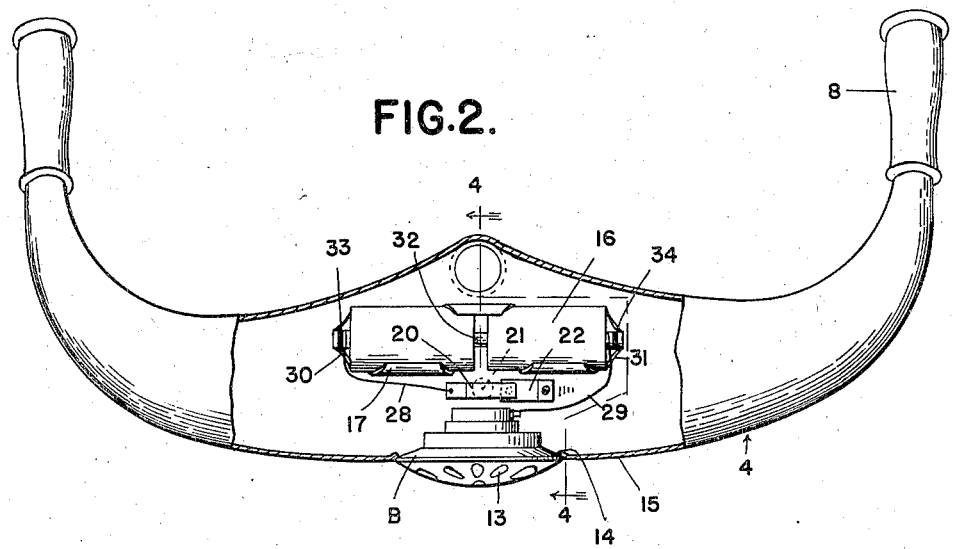
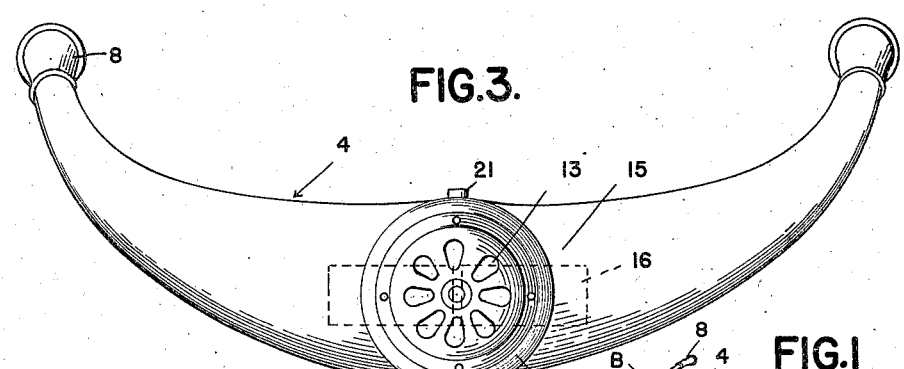
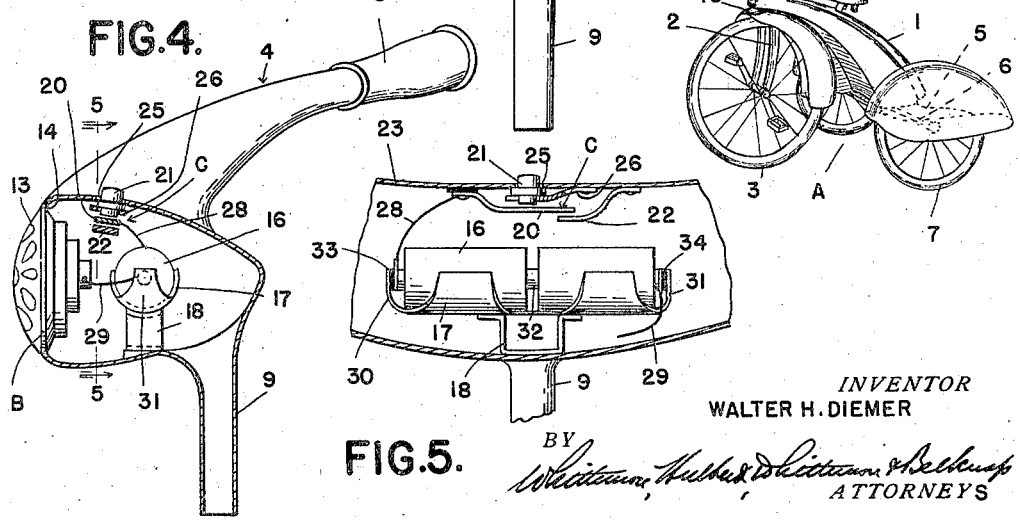
INVENTOR
WALTER H. DIEMER Patented Jan. 10, 1939

2,143,434

UNITED STATES PATENT OFFICE 2,143,434

VELOCIPEDE CONSTRUCTION

Walter H. Diemer, Toledo, Ohio, assignor to The American-National Company, Toledo, Ohio, a corporation of Ohio Application May 16, 1935, Serial No. 21,883

7 Claims. (Cl. 177—7)

This invention relates generally to velocipedes and has for one of its objects the provision in a handle bar thereof of means for carrying an audible sound device or noise maker.

Another object of the invention is to provide an electrically operated audible sound device and accessories that are self-contained within a handle bar formed from sheet metal.

Another object is to provide a hollow handle bar having an opening in one wall thereof for a grille of a sound device, and another opening for a push button of the switch used for controlling an electric circuit to the device.

Another object is to provide a handle bar and noise maker assembly wherein all parts of the noise maker, except the grille and push button, are concealed and out of reach so that there is absolutely no danger of a child snagging clothing, cutting fingers or otherwise being hurt by playing with the velocipede or operating the noise maker.

Other objects, advantages and novel details of construction of this invention will be made more apparent as this description proceeds, especially when considered in connection with the accompanying drawing, wherein:

Figure 1 is a perspective view of a velocipede having a handle bar assembly embodying my invention;

Figure 2 is a top plan view of the handle bar assembly with parts broken away and in section;

Figure 3 is a front elevation of the handle bar assembly;

Figure 4 is a vertical sectional view taken substantially on the line 4—4 of Figure 2;

Figure 5 is a vertical sectional view taken substantially on the line 5—5 of Figure 4.

Referring now to the drawing, A is a velocipede having a backbone 1, a steering fork 2 mounted to turn in the backbone adjacent the forward end thereof and supported on a ground-engaging wheel 3, a handle bar 4 for turning the fork 2 and wheel 3, a platform 5 rigid with the backbone at its rear end, an axle 6 rigid with the platform, and ground-engaging wheels 7 carried by said axle.

In the present instance, both the backbone 1 and handle bar 4 (except the rubber grips 8) are hollow and are preferably formed from sheet metal. As shown, the handle bar 4 has a depending stem or post 9 of tubular formation which is connected to the upstanding shank or post 10 of the steering fork 2 within the hollow backbone member, suitable bearings for said parts being provided in the backbone member at the top and bottom thereof to enable the fork to be easily turned by the handle bar.

The audible sound device or noise maker B is preferably located within the hollow handle bar 4 in advance of the hollow post 9 and has a grille 13 anchored in an opening 14 in the front wall 15 of the handle bar. Such device B may be any suitable construction or design capable of giving forth an audible sound or noise and is preferably electrically operated. The electrical energy is derived from suitable batteries 16 mounted in a trough-shaped clip 17 on a bracket 18 in the hollow handle bar, and is controlled by a switch C having a contact element 20 movable by a push button 21 against a stationary contact element 22. Preferably the movable contact element 20 is connected at one end to and insulated from the top wall 23 of the hollow handle bar, while the stationary contact element 22 is connected at one end directly to said top wall 23 so as to be grounded thereto. The push button 21 may be any suitable design and is movable vertically in an opening 25 in the top wall 23 of the handle bar. Any suitable means such as the leaf spring 26 anchored to the top wall 23 of the handle bar may be employed for normally holding the push button 21 in an accessible inoperative position. 28 is an electric wire extending from the movable contact element 20 to an outer end of one of the batteries 16, while 29 is an electric wire leading from the outer end of the other battery 16 to the sound device B. Thus, when the push button 21 is pressed downwardly to close the electric circuit, the current flows from the batteries 16 through wire 28, movable contact 20, stationary contact 22, handle bar 4, sound device B, and wire 29. As a result, the device B will give forth an audible sound or noise and will continue to do so while such switch is closed. However, as soon as the push button 21 is released, the spring 26 will move it up so that the movable contact 20 will, by its own spring action, be disengaged from the stationary contact element 22.

To insure proper contact between the batteries 16 in the clip 17, I have provided at opposite ends of the clip upturned fingers 30 and 31 that urge the inner terminals 32 of the batteries against one another. To prevent any short circuit, suitable insulation 33 and 34, respectively, is used between the fingers and the outer terminals of the batteries, and the wires 28 and 29, respectively, are connected to said outer terminals upon the inner sides of such insulation, as clearly illustrated in Figure 5.

Thus, from the foregoing, it will be readily apparent that all parts of the sound device and accessories, except the grille 13 and push button 21, are concealed within the hollow handle bar, in fact all parts are carried by the handle bar alone. It is a self-contained unit. However, if desired, the batteries 16 may be carried within the hollow backbone 1, in which event the wire 28 would be longer and would extend down through the hollow post 9 to the batteries in the backbone, while the wire 29 would also be longer and would extend up from the batteries through the hollow post 9 to the sound device. No insulation is used between the backbone 1 and the handle bar post 9, hence the switch elements 20 and 22 and push button 21 may be mounted in the backbone 1. In this event, the contact element 22 would be grounded to the backbone 1 and the current would flow from the backbone 1 through the post 9 and handle bar 4 to the sound device B. Hence, the modification just described would be just as effective as in the self-contained handle bar illustrated in Figures 1 to 5, inclusive.

What I claim as my invention is:

1. In combination, a handle bar having a top wall and a depending wall, an audible sound device fastened to said depending wall, and an electric switch in circuit with said sound device and having an operating push button extending through and accessible above said top wall.

2. In combination, a handle bar having walls disposed at substantially right angles to one another, an audible sound device fastened to one of said walls, and an electric switch in circuit with said sound device and having an operating push button extending through the other of said walls.

3. In combination, a handle bar having a wall provided with a small opening and an adjacent wall provided with a larger opening, an audible electric sound device fastened to said second mentioned wall and having a grille concealing the opening therein, and an electric switch in circuit with said sound device and having an operating push button extending through the small opening in the first mentioned wall.

4. A velocipede handlebar assembly comprising a handlebar having a top wall and a depending front wall, said top wall having a small circular hole therein, an electric audible sound device fastened to said depending wall, and an electric switch in circuit with said audible sound device and including a stationary electric contact, a movable electric contact engageable with said stationary contact, and a manually operable push button mounted to reciprocate in the hole aforesaid in said top wall, said stationary and movable contacts being arranged in overlapping relation beneath and in a common vertical plane with said push button, and said push button being normally projected and accessible above said top wall and adapted upon being depressed in said hole to move the movable contact into engagement with said stationary contact to close the electric circuit to the audible sound device.

5. In an article of manufacture, an electric noise making device capable of being positioned within a handle bar, a dry cell, an electrical conductor extending from said dry cell to a point directly over the coil of said electric noise making device, and means for controlling the operation of said electric noise making device extending upwardly from the rear portion of said handle bar.

6. In an article of manufacture, an electric noise making device capable of being positioned within a handle bar, a dry cell, an electric switch also within the handle bar and having an operating member extending upwardly through said handle bar, and an electrical conductor extending from said dry cell to said switch.

7. In an article of manufacture, an electric noise making device capable of being positioned within a handlebar, a dry cell, an electric switch also within the handlebar and having an operating member extending upwardly through said handlebar, an electrical conductor extending from the dry cell to said electric noise making device, and an electrical conductor extending from said dry cell to said switch.

WALTER H. DIEMER.